June 24, 1958 R. D. ALLUM ET AL 2,840,641

TELEPHONE SYSTEMS

Filed Feb. 9, 1956 3 Sheets-Sheet 1

Inventors
ROBIN DEVENISH ALLUM
GORDON WILLIAM HELSBY
By Young, Emery + Thompson
Attorneys Inventors
ROBIN DEVENISH ALLUM
GORDON WILLIAM HELSBY
By Young, Emery + Thompson
Attorneys

TELEPHONE SYSTEMS

Filed Feb. 9, 1956 3 Sheets-Sheet 3

Inventors
ROBIN DEVENISH ALLUM
GORDON WILLIAM HELSBY
By Young, Emery & Thompson
Attorneys United States Patent Office 2,840,641 Patented June 24, 1958

2,840,641

TELEPHONE SYSTEMS

Robin Devenish Allum and Gordon William Helsby, Liverpool, England, assignors to Automatic Telephone & Electric Company Limited, Liverpool, England, a British company Application February 9, 1956, Serial No. 564,553

Claims priority, application Great Britain March 11, 1955

7 Claims. (Cl. 179—18)

Figure 1:
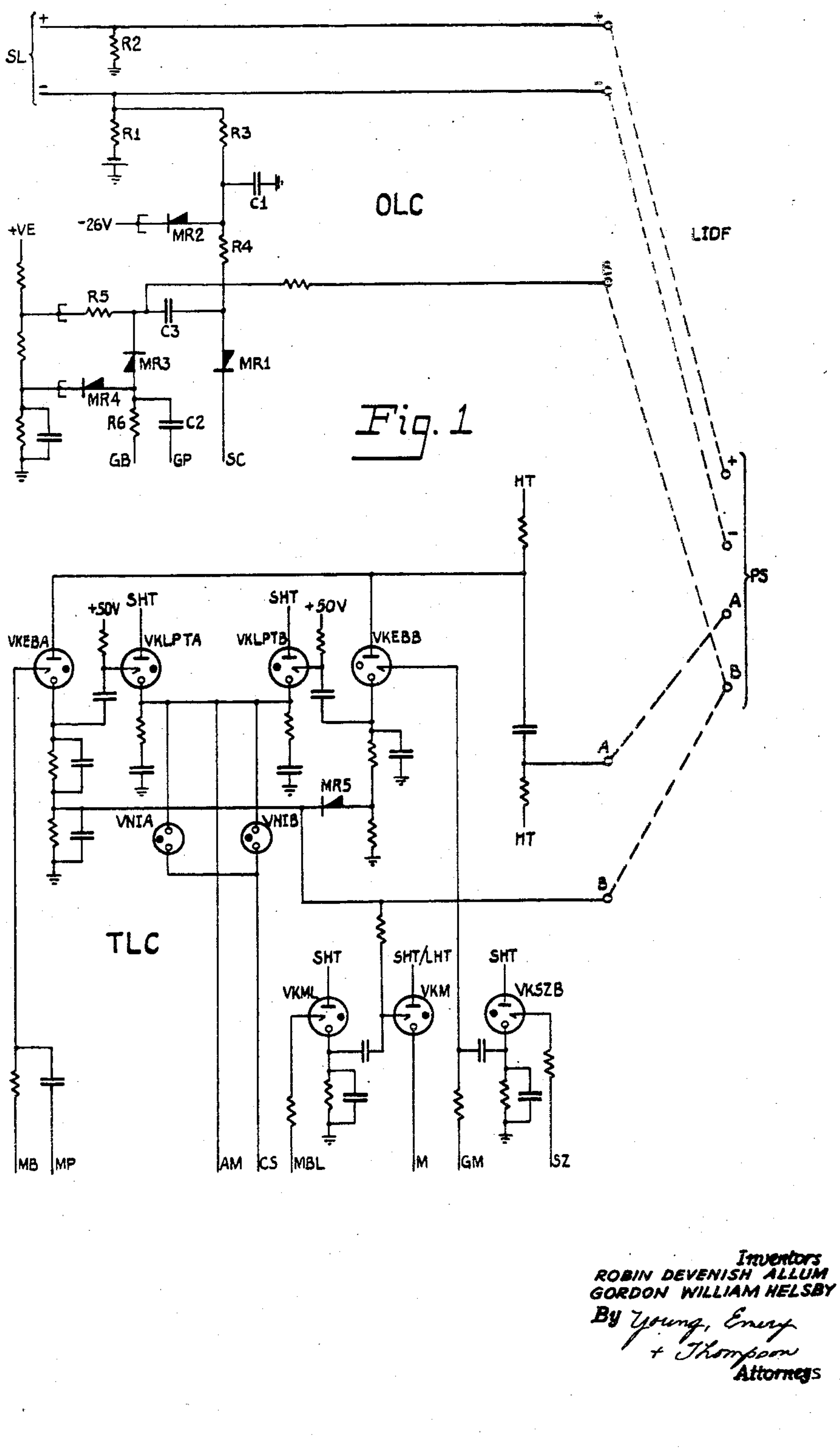

The present invention relates to automatic telephone systems and is more particularly concerned with circuit arrangements for dealing with P. B. X (private branch exchange) groups of lines in such systems.

The invention is particularly applicable to the scanning and marking arrangements for subscriber's line circuits which are described in United States application No. 541,271 and which are employed in the singularisation of a calling or called subscriber's line circuit for the purpose of initiating the setting-up of a connection over a line finder/final selector switching stage from such a line circuit. It should, however, be understood that the invention is not limited to its use in such an arrangement but is of general application.

In the typical embodiment of the arrangement described in said copending application, the exchange is divided into 2000-line portions as regards the subscribers' line circuits, and the circuits of each such portion are divided into groups of 400, each of which is served by a line finder/final selector arrangement comprising a plurality of switching units involving a pair of primary switches and a secondary switch. Moreover the subscribers' line circuits of each 2000-line portion are disposed in 100-line blocks in accordance with their directory numbers for scanning and marking purposes, a separate scanning and marking equipment being used for each said portion. The jumpering facility provided by the L. I. D. F. (line intermediate distribution frame), located between the subscribers' line circuits and the equipment positions at the line finder/final selector primary switches, gives complete flexibility as regards the association of the 2000 line circuits and the equipment positions provided by the relevant five line finder/final selector switching arrangements.

One of the objects of the present invention is to provide improved arrangements for dealing with groups of P. B. X lines. A further object of the invention is to form P. B. X group of lines of any size within a 2000-line portion of the exchange, again with complete flexibility as regards the relationship of line circuits to their locations for scanning and marking purposes and also to the equipment positions.

According to the invention, in an automatic telephone exchange, a hunting circuit having a number of stages equal to the largest number of anticipated lines in a group of private branch exchange lines is provided in common to a plurality of such groups of lines, means being provided for marking the available or unavailable condition of the line circuits of any one group of lines at a time in the successive stages of the hunting circuit whereby on the stage-by-stage operation of the hunting circuit, the first available line circuit of said one group of lines is taken into use.

According to a feature of the invention, in an automatic telephone exchange, each group of a plurality of groups of private branch exchange lines is provided with individual equipment which is taken into use following the dialling of the directory number of the associated group of lines, to cause an indication to be given of the available or unavailable condition of the line circuits of the group at successive stages of a hunting circuit provided in common to said plurality of groups of line circuits whereupon the hunting circuit operates stage-by-stage to take into use the first available line circuit of the group.

According to another feature of the invention, in an automatic telephone exchange, a hunting circuit having a number of stages equal to the largest number of anticipated lines in a group of private branch exchange lines is provided in common to a plurality of such groups of lines, the line circuits of the same choice lines in the different groups making an appearance at one stage of the hunting circuit and each group of line circuits is provided with individual equipment which is taken into use following the dialling of the directory number of the associated group of lines, to cause an indication to be given to the appropriate stages of the hunting circuit of the available or unavailable condition of the line circuits of said group and subsequently to initiate the stage-by-stage operation of the hunting circuit whereby the first available one of the group of line circuits is taken into use.

According to a further feature of the invention, in an automatic telephone exchange, when a connection is set up in response to the dialling of a directory number representing an ordinary subscriber's line a signal is applied to the relevant line circuit to take it into use if available while in response to the dialling of a directory number representing a group of private branch exchange lines a signal is applied to equipment which is common to all the line circuits of the group of lines and which serves to determine which lines in the group are available and to initiate a hunting operation to take into use one of said available lines.

The general practice in the setting up of a call to a P. B. X is that in response to the dialling of the P. B. X directory number, equipment is adapted to test the lines of the group in prescribed order, so that the first to be encountered in an idle state is taken into use. On the other hand it is often necessary to provide the facility whereby a connection may be set-up directly to a particular line in the P. B. X, for instance, a night-service line, by dialling the directory number appropriate to that line. Another probable requirement is that it should be possible to originate calls over any of the lines of the P. B. X group.

In meeting these requirements in the manner contemplated by the present invention it has been found necessary to provide P. B. X lines with line circuits involving more components than the ordinary line circuit described in said copending specification.

The ordinary line circuits will greatly out-number the P. B. X line circuits in an exchange and it would be uneconomic in space if, in the mounting of line circuits in their 100-line blocks, the space allocated to each line circuit equipment were to be determined in accordance with that required by the larger P. B. X line circuit equipments.

It would, of course, be possible from the mounting point of view to separate P. B. X line circuits completely from their relevant 100-line blocks, but in order to give complete flexibility in the allocation and conversion of ordinary and P. B. X lines it would be necessary to extend a large number of connections from each position in the 100 line blocks to a terminal field where connections to the P. B. X line circuits could be effected. Moreover since the latter circuits, like the ordinary circuits, are to be scanned for the purpose of determining call originations, it is not desirable to feed the low-level pulses employed for this purpose, over additional cabling.

Accordingly for practical considerations it is proposed to mount the P. B. X line circuits in two parts which for convenience will be referred to as originating and terminating line circuits, but the use of these terms should not be interpreted as giving a clear demarcation between the functions of the two circuits. An originating line circuit includes the elements concerned with accepting scanning conditions, together with speaking conductors provided with battery feeding resistors which are to be employed on call originations for deriving a potential for gating the scanning conditions. The speaking conductors are used on both originating and terminating calls. The remaining circuit elements of the composite line circuit, which are principally concerned with call terminations, are contained within the terminating line circuit.

The originating line circuit equipments are of such size as to be interchangeable with normal line circuit equipments. The terminating line circuit equipments, which are somewhat larger, are mounted separately and it will be shown that the necessary interconnection of both parts of the composite line circuit is accomplished in a relatively simple manner at the L. I. D. F.

The originating line circuits of a P. B. X group may be mounted in place of normal line circuits in the 100 line blocks served by the same scanning and marking equipment i. e. in the same 2000-line portion of the exchange. A. P. B. X group may involve originating line circuits disposed in the same hundred line block or in a plurality of such blocks. Preferably the line circuits would be of the plug-in type so that conversion from one type to the other can readily be effected.

Although it is advantageous from a mounting space point of view of divide the P. B. X line circuits into two parts as previously described, the line circuit could be provided as a single entity and the circuit operation would be the same as that to be described with reference to the preferred divided line circuit.

Figure 2:
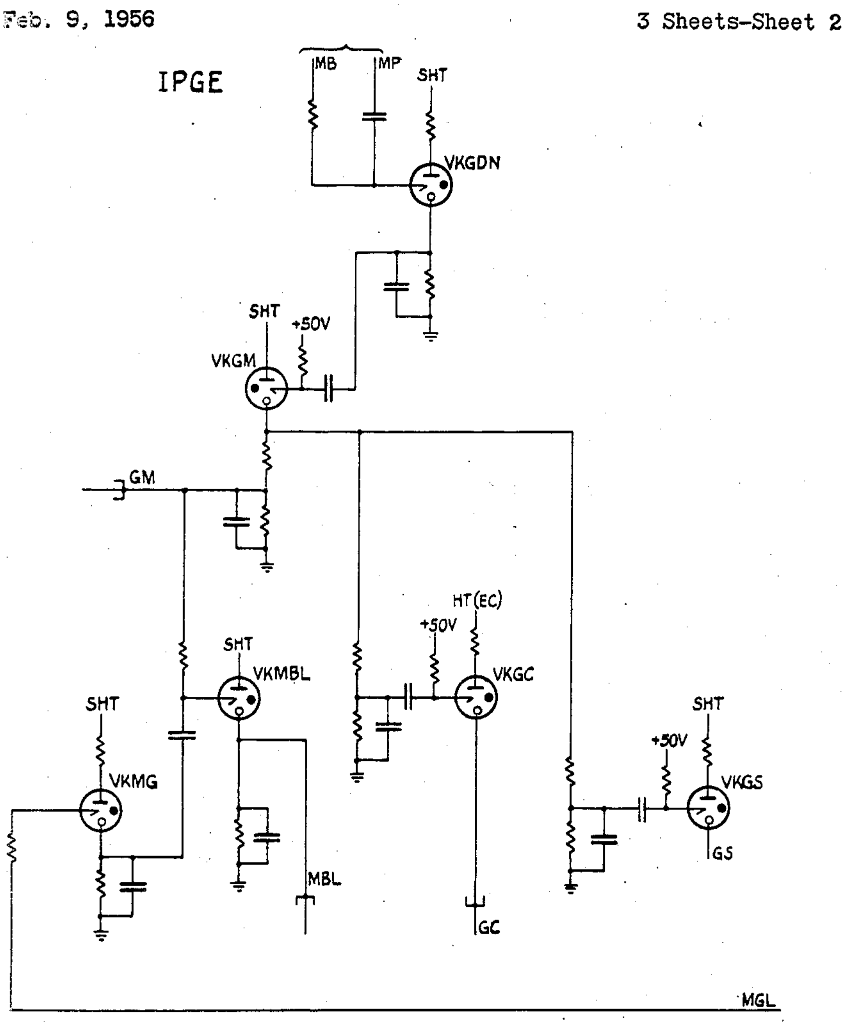
Figure 3:
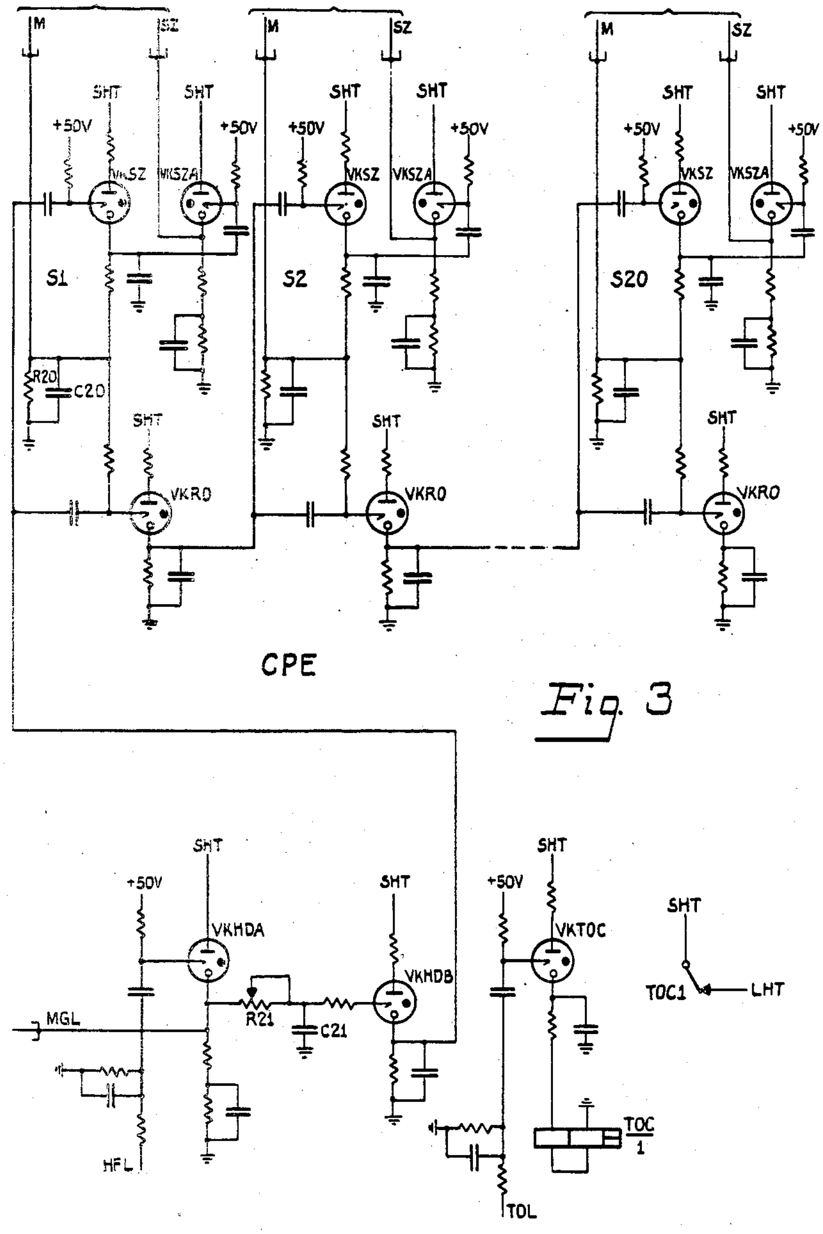

The invention will be better understood from the following description of the preferred embodiment which should be read in conjunction with the accompanying drawings comprising Figs. 1 to 3. In the drawings:

Fig. 1 shows a composite subscriber's line circuit comprising originating and terminating line circuits designated OLC and TLC respectively, Fig. 2 shows the circuit of a P. B. X group equipment which is individual to a P. B. X group of lines, and Fig. 3 is the circuit of common P. B. X equipment which is provided on the basis of one for all P. B. X groups of lines served by the same line scanning and marking equipment, i. e. it is common to a 2000-line portion of the exchange.

The common P. B. X equipment CPE shown in Fig. 3 incorporates a high-speed hunting circuit involving a number of stages which is at least equal to the number of lines in the largest P. B. X group. Twenty stages are provided in the present example of which stages S1, S2 and S20 are represented. Each stage has three cold-cathode triode tubes, a "seize" tube VKSZ with its auxiliary tube VKSZA, and a "run-on" tube VKRO. The stages are adapted for activation in numerical order starting at stage S1.

The originating line circuits of the P. B. X such as that designated OLC in Fig. 1 are adapted to receive scanning bias and pulse conditions, at leads GB and GP respectively, from the line scanning and marking arrangements in accordance with the positions they occupy in the 100 line block. As described in United States application No. 541,271 the bias conditions are obtained directly from the tens digit distributor whereas the pulse conditions are derived from the relevant 100-line units-digit pulse control circuit. Lead SC as in the case of ordinary subscribers' line circuits extends to a pulse amplifier associated with said pulse control circuit.

In the terminating line circuit TLC, leads MB and MP are arranged to receive marking bias and pulse conditions respectively from the scanning and marking equipment, and again the biases are derived directly from the tens digit distributor of the scanner whereas the pulses are obtained from the appropriate 100-line units digit pulse control circuit. A terminal field would be provided for the marking bias and pulse sources and by appropriate strapping connections to leads MB and MP of the terminating line circuits the correct relationship between the scanning of an originating line circuit and the marking of its partner terminating line circuit is obtained.

Again referring to Fig. 1 the jumper connections over the L. I. D. F. indicated by broken lines, connect the partner line circuits to the required equipment position upon the line finder/final selector over paths PS which extend to a multipled equipment position (primary crossbar switch crosspoints) of a line finder/final selector arrangement. It can be seen that the L. I. D. F. serves to connect terminal B in the originating and terminating line circuits together.

Leads M and SZ of each terminating line circuit of a P. B. X group are associated with the corresponding leads of different stages of the hunting circuit in the common P. B. X equipment CPE. Thus, for example, if a P. B. X group has ten line circuits these might be connected to the first ten stages. It should be noted that the various pairs of leads M and SZ in equipment CPE will in many cases serve a plurality of line circuits in different P. B. X groups. Lead AM of the terminating line circuits extends over the L. I. D. F. to appropriate points in the equipment position indicator and is to be employed in indicating the location of a singularised subscriber's line circuit with respect to the line finder/final selector stage, and in defining those paths through said stage which are available for use. Lead CS extends to a class-of-service circuit. Leads GM and MBL in the P. B. X group equipment IPGE (Fig. 2) extend to corresponding leads of all terminating line circuits of the relevant group.

With the exception of the diodes VNIA and VNIB, all the tubes shown in the various circuits are cold-cathode gas-filled triodes and it will be noted that, in the majority of cases, the anode potentials are derived over leads SHT. These leads are connected to so-called switched high tension supply which is controlled in the manner described in United States application No. 541,271 in that it is interrupted by the so-called 2000-line control circuit when all the necessary functions have been performed by the circuits.

No line circuit is connected in that position in a 100-line block which is appropriate to the directory number of a private branch exchange group of lines, nor is a terminating line circuit provided. That is to say, the provision of a private branch exchange group of lines involves the loss of one line circuit position. Instead the marking bias and pulse appropriate to that position are strapped to lead MB and MP of the individual group equipment IPGE.

The operation of the circuits with respect to a call to a P. B. X will now be described. When the exchange controller has been supplied with the directory number of the P. B. X, scanning of the lines in the 2000-line portion of the exchange is stopped temporarily, and the scanning and marking equipment is conditioned by the controller to apply a marking bias and a marking pulse respectively to leads MB and MP of the group equipment. The bias and pulse are effective, over a resistor and capacitor respectively, in firing tube VKGDN and accordingly the required group is defined. A pulse derived from the cathode of the tube is applied to the trigger electrode of the permanently primed tube VKGM which is therefore rendered conducting. The latter may be referred to as the group marking tube, and, upon being fired, it causes a positive bias to be applied over lead GM to the trigger electrode of tube VKEBB in each of the terminating line circuits of the group. At the same time tube VKGM primes tube VKMBL, and another potential derived from the cathode of tube VKGM is employed to fire the permanently primed tubes VKGC and VKGS. Tube VKGC derives its anode potential over lead HT(EC) from the exchange controller, and furthermore its cathode load is incorporated in the exchange controller. The increase in voltage across said cathode load is used to indicate to the exchange controller that it is to deal with a P. B. X call. The function of tube VKGS will be referred to more specifically with reference to trunk-offering.

At this juncture the exchange controller applies a signal to lead HFL of the P. B. X common equipment CPE, and therefore a positive pulse is produced at the trigger electrode of the permanently primed tube VKHDA which is consequently fired. With the conduction of the tube VKHDA, a firing potential, produced at its cathode is extended over common lead MGL to corresponding leads in each group equipment and this fires tube VKMG in each said equipment. The positive potential at said cathode is also extended to a delay circuit, incorporating a variable resistor R21 and a capacitor C21, and this is connected over another resistor to the trigger electrode of tube VKHDB.

Upon tube VKMG in each P. B. X group equipment being fired, a triggering pulse obtained from its cathode is applied to the tube VKMBL, but only tube VKMBL in the chosen P. B. X. group equipment is fired since it is the only one which is primed. The conduction of tube VKMBL causes a firing potential to be applied over lead MBL to the trigger electrode of tube VKML in all terminating line circuits of the particular P. B. X group, and accordingly each of the latter tubes extends a pulse to the corresponding tube VKM which will be fired only if the line circuit is in a busy condition. It may be noted that the busy condition is denoted by the presence of a positive potential upon the B wire of the terminating line circuit, and this potential may be derived from the cathode circuits of the temporary busy tubes VKEBA and VKEBB or, if the line circuit is actually involved in a connection over the line finder/final selector, by way of the relevant operated crosspoint of the primary crossbar switch employed. It will be apparent that the busy-indicating potential is used to prime the tube VKM so that, as mentioned, only those tubes of busy line circuits of the requisite P. B. X. group are now fired due to the condition obtaining at lead MBL of the chosen P. B. X group equipment. With regard to the line circuit tubes VKM the anodes of all those except the last (in order of testing of the line circuits) obtain high-tension over the switched HT lead SHT from the 2000-line control circuit, the tube of the last line in each group deriving its supply from lead LHT in the common P. B. X equipment CPE. The special treatment of tube VKM of last line is to enable trunk offering to be effected if all the lines of a group happen to be busy, and this facility will be referred to later.

At this juncture the condition of the line circuits of the required P. B. X group, arising out of the seizure of the P. B. X group equipment is that tube VKEBB is primed irrespectively of whether the line circuit is idle or busy, and that tube VKM is conducting only if the line circuit is already busy.

As already mentioned the high-speed hunting circuit is common to all P. B. X groups in the 2000-line portion of the exchange and the leads M and SZ of each stage therefore extend to at least one, probably more, line circuits. Thus the parallel arrangement of a capacitor and resistor such as C20 and R20 in each stage may constitute the cathode load for several tubes VKM in line circuits of different groups. When any tubes VKM in line circuits of the particular P. B. X are fired as previously described the resultant positive potentials developed at the relevant cathode loads serves to prime and bias-back the related tubes VKRO and VKSZ respectively of stages of the hunting circuit. However in those stages corresponding to idle lines in the required P. B. X group, tube VKRO remains unprimed and tube VKSZ is not biased-back. Thus the idle or busy state of the line circuits of the particular P. B. X group is defined at the corresponding stages of the high-speed hunting circuit.

After a suitable delay, the potential across the capacitor C21, in the delay circuit connected between the cathode of tube VKHDA and the trigger electrode of tube VKHDB, builds-up to a value sufficient to render tube VKHDB conducting. Thereupon a pulse, developed at the cathode of the latter, is extended through individual capacitors to the trigger electrodes of tubes VKSZ and VKRO of the first stage of the high-speed hunting circuit. The condition at present obtaining at said stage is determined according to whether the corresponding line circuit of the group is idle or busy. If the first possibility applies, the permanently primed tube VKSZ is now fired, and consequently a pulse from the cathode of the latter renders the primed auxiliary tube VKSZA conducting. This in turn applies a positive potential from its cathode to common lead SZ of the first stage and thence to the corresponding lead in all first-to-be-tested line circuits of the various P. B. X groups, and accordingly tube VKSZB in each of these line circuits is fired.

Referring to the composite line circuit (Fig. 1) and assuming that this is the first in the required group, the firing of tube VKSZB therein causes a pulse developed at its cathode to be extended to the trigger electrode of tube VKEBB. The latter tube like all the similar tubes of line circuits in the same group is already primed, to the exclusion of tubes VKEBB in other groups, and accordingly tube VKEBB in the particular line circuit conducts. The tube is effective in two respects. Firstly, a positive pulse from the cathode is applied to the trigger electrode of the permanently primed tube VKLPTB which therefore fires, and secondly another positive potential derived from the cathode circuit is connected over rectifier MR5 to the B conductor in the terminating line circuit and thence by way of the L. I. D. F. to the B conductor of the originating line circuit also. The positive potential constitutes a temporary guarding condition for both line circuits, in the terminating line circuit it served to prime tube VKM whereas in the complementary line circuit, the potential is applied over a resistor to the gate rectifier MR3 so that this gate is blocked. The blocking of the gate ensures that the line circuit is guarded against intrusion by the scanning equipment when the latter is restarted after a short interval to deal with any call origination which may arise.

The cathode of tube VKLPTB is arbitrarily connected over lead AM to one of 400 terminals in an equipment position indicator of the type disclosed in United States application No. 541,271 and this terminal, besides extending to a co-ordinate marking field extends over a resistor to earth. This resistor forms part of the cathode load of tube VKLPTB and then this tube is fired, as it is at present, the voltage developed across it serves to activate the co-ordinate marking field to indicate the location of the line circuit with respect to the line finder/final selector stage and also to define those paths through said stage which are available to the singularised composite line circuit.

The firing of tube VKLPTB also results in the conduction of the diode tube VNIB so that a pulse is applied over lead CS to a class-of-service discriminating circuit.

The switched HT derived over the various leads designated SHT is duly interrupted by the 2000-line control equipment and those conducting tubes served from this source are therefore extinguished. However the busy tube VKEBB, which like tube VKEBA derives its anode supply from a permanent high tension source, remains conducting until the relevant primary switch (line finder/final selector) crosspoint is closed whereupon earth is returned to terminal A of path PS to produce a sudden drop in potential at the anode of said tube to extinguish it. However the extinguishing is ineffectual since the primary switch also connects a suitable positive potential to lead B to maintain tube VKM primed and rectifier MR3 backed-off, and this condition is maintained for the duration of the call.

The sequence of events which would have arisen in the common P. B. X equipment CPE if the first line circuit of the wanted P. B. X had been busy will now be described. In this case the pulse obtained from the cathode of tube VKHDB causes tube VKRO, of the first stage S1 of the high speed hunting circuit, to fire instead of tube VKSZA. Tube VKRO thereupon passes a positive-going pulse to the input of the second stage S2 wherein tube VKSZ and tube VKSZA fire if the second-to-be-tested line circuit of the group is idle, or, if that line circuit is busy tube VKRO of the stage is fired. It will be obvious if the second line circuit is idle it would be operated upon and singularise in the manner already described, or again if it is busy the "run-on" tube VKRO of the second stage would fire and pass a signal to the input of the third stage where either of the two possibilities may exist. It follows that the high-speed hunting circuit once started by the exchange controller is operative stage by stage until an idle line circuit is encountered, or, in the case of all lines of the group being busy, until the run-on tubes in all stages have been fired. In any event the interruption of switched HT after a prescribed interval extinguishes any fired tubes which are served by it. Normally when all lines are encountered busy, an appropriate tone would be returned to the party of equipment not shown.

In the copending U. S. application No. 541,271 arrangements were provided to enable trunk offering by an operator to be effected to busy regular subscriber's line circuits. The arrangements were such that in the course of trunk offering, and since singularisation of a line circuit in the particular 2000-line portion of the exchange is effected on a one-at-a-time basis, the busy condition (temporary or sustained) was removed from the line circuit to enable the operator to gain access to it. In the present case of P. B. X working it is intended to enable trunk offering to be performed on the last line circuit of the P. B. X group, and so it becomes necessary, at the appropriate time to ensure that the particular line circuit is marked as being idle with respect to the high-speed hunting circuit of equipment CPE, but also it is necessary to ensure that other busy line circuits are adequately guarded when hunting is effected. Therefore in the last-to-be-tested terminating line circuit of each group, the anode of tube VKM is connected to switched HT by way of lead LHT of the common P. B. X equipment instead of directly to switched HT, and thus the supply is controlled by contacts TOC1 in said equipment. Furthermore, to ensure that other busy line circuits remain adequately guarded during hunting, the temporary busy tubes VKEBB and VKEBA are arranged not to be extinguished as was the corresponding tube in the regular line circuit of the prior application and also precautions are taken to ensure that the regular guarding condition returned to lead B, of line circuits already involved in connections, from primary switch crosspoints is re-applied before hunting over the P. B. X group proceeds.

The firing of tube VKGS in the individual P. B. X group equipment takes care of the latter requirement since a potential derived from its cathode load terminated upon lead GS (extending to other equipment not shown) is utilised for this purpose. The other requirement, namely the idle marking of the last line in the group, is accomplished when a positive signal is applied to lead TOL by the exchange controller when the latter is conditioned to deal with a trunk-offering call. The signal is effective in firing the permanently primed tube VKTOC, and consequently the high-speed relay TOC in its cathode circuit is operated. Thereupon switched HT is removed from LHT and so the firing of tube VKML in the last line circuit of the group by the P. B. X group can not render tube VKM conducting and the line circuit appears as being idle with respect to the common hunting circuit.

On trunking-offering calls the hunting circuit is started as for normal P.B.X calls and if any line circuit preceding the last happens to be idle, the first to be encountered is chosen for singularisation and is ultimately employed in the connection, whereas if all these lines are busy, the last one is singularised whether actually busy or not and a connection is set-up to it from the operator who would then offer the call.

Rectifier MR5 associated with the cathode circuit of tube VKEBB in the terminating line circuit ensures that the latter tube is not biased-back by a busying potential which may be present on the B conductor.

All the line circuits of a P.B.X group may be used as ordinary line circuits for terminating calls if the directory number of the individual line (instead of the P.B.X directory number) is dialled by the caller. In these circumstances the P.B.X group and common equipment are not taken into use and the particular terminating line circuit is marked by bias and pulse potentials over leads MB and MP. Therefore the particular line alone is tested and P.B.X hunting is not employed. Accordingly tube VKEBA in the terminating line circuit, is fired if not biased-back by an existing busy condition, and tubes VKLPTA and VNIA are fired to energise lead AM and CS for the purposes already mentioned.

The operation of the composite P.B.X line circuit with respect to call originations, as distinct from call terminations is substantially the same as was described in United States application No. 541,271 and this will now be described briefly. When a call is originated current flow through resistors R1 and R2 and the looped line SL causes the potential at resistor R1 to become more positive and this condition is extended over resistors R3 and R4 to rectifier MR1 but is not otherwise effective since the latter is backed-off by a positive potential on lead SC from a pulse amplifier associated with the units digit pulse control circuit. Rectifier MR2 extending to a source of negative potential is included for line resistance compensation purposes whereas capacitor C1 is for the absorption of line pulses which might simulate a calling condition. When the scan reaches the particular calling line, a positive bias potential, persisting for the duration of a units digit scanning cycle, is received over lead GB, and a positive pulse is received over lead GP. The bias opens the gate comprising rectifier MR3 and resistor R5, the latter deriving a positive potential from a potentiometer arrangement common to a 100-line block. The pulse from lead GP is therefore transmitted over capacitors C2 and C3 to rectifier MR1. It is to be noted that the aforesaid potentiometer provides a bias to rectifier MR4 which acts as a limiter for the GB bias and GP pulse potentials. The GP pulse together with the calling line bias is now sufficient to overcome the backing-off potential applied to rectifier MR1, and the pulse is therefore extended over lead SC to the amplifier to bring about cessation of the scanning operation.

Concurrently with the application of bias potential to lead GB of all those line circuits in the twenty 100-line groups having the same tens digit as the calling P. B. X line, another bias potential is applied to the corresponding lead MB in the terminating line circuit. This potential primes the cold-cathode triode tube VKEBA which is eventually fired by a pulse received over lead MP from the units digit pulse control circuit as a result of the marking applied over lead SC to the amplifier when the calling line was encountered by the scan. Upon tube VKEBA conducting a firing pulse is applied to the trigger electrode of the permanently primed tube VKLPTA which now remains conducting until the switched HT is interrupted, and during this period the voltage rise at its cathode is extended over lead AM for position indication and path defining purposes. Also whilst tube VKLPTA is conducting, the diode tube VNIA is fired so that a pulse is applied to the class-of-service discrimination circuit over lead CS. In the case of a call origination as at present, the pulse over lead CS is also effective together with a condition obtained from the 2000-line control circuit, in initiating connection to the originating controller.

Also due to the firing of tube VKEBA in the terminating line circuit, a positive potential, derived from its cathode load is connected to lead B in the originating and terminating line circuits for temporary guarding purposes. The tube is subsequently extinguished when earth is applied to lead A by the closure of the primary switch crosspoint concerned in the connection of the line circuit to an originating trunk relay set and register. At this juncture the guarding function is taken over for the duration of the call by a condition returned to lead B over said crosspoint.

We claim:

1. An automatic telephone exchange including a plurality of groups of private branch exchange lines, a hunting circuit provided in common to all said groups of private branch exchange lines and having a number of stages equal to the largest number of anticipated lines in a group, means responsive to the dialling of the directory number of one group of private branch exchange lines for marking the available and unavailable condition of the lines of said one group in the successive stages of said hunting circuit and means for initiating the stage-by-stage operation of said hunting circuit to take into use the first one of the available lines of said one group.

2. An automatic telephone exchange including a plurality of groups of private branch exchange lines, a plurality of group equipments provided on the basis of one for one group of private branch exchange lines, means responsive to the dialling of the directory number of one group of private branch exchange lines for taking into use the group equipment corresponding to said one group of private branch exchange lines, a hunting circuit provided in common to all said groups of private branch exchange lines and having a number of stages equal to the largest number of anticipated lines in a group, means responsive to the taking into use of said group equipment for marking the unavailable condition of any of the lines of said group in the stages of said hunting circuit and means for initiating the stage-by-stage operation of said hunting circuit to take into use the first one of the available lines of said one group.

3. An automatic telephone exchange as claimed in claim 2 wherein the same choice lines in all the groups of private branch exchange lines make an appearance at one stage of said hunting circuit.

4. An automatic telephone exchange comprising subscribers' lines, first line circuits terminating said subscribers' lines at the exchange, a plurality of groups of private branch exchange lines, second line circuits terminating the private branch exchange lines at the exchange, means responsive to the dialling of the directory number of one of said subscribers' lines for applying a signal to the relevant line circuit if available to take it into use, a hunting circuit provided in common to all the groups of private branch exchange lines and having a number of stages equal to the largest number of anticipated lines in a group, a plurality of group equipments provided on the basis of one for one group of private branch exchange lines, means responsive to the dialling of the directory number of one group of private branch exchange lines for applying a signal to the group equipment corresponding to said one group of lines, means responsive to the application of said signal to said group equipment for marking unavailable ones of said second line circuits in the stages of said hunting circuit and means for initiating the operation of said hunting circuit to take into use the first available one of said second line circuits.

5. An automatic telephone exchange as claimed in claim 4 wherein said first and second line circuits are divided into 100-line blocks, the line circuits of each block being arranged on a two-coordinate basis in accordance with the directory number of the lines and the position in a 100-line block representing the directory number of a group of private branch exchange lines is unequipped while the lines of the group are each given a directory number and the corresponding positions in at least one of the blocks are equipped to enable connections to be set up to any individual line of the group.

6. An automatic telephone exchange including a plurality of groups of private branch exchange lines, at least one line of a group having an individual directory number while each group of private branch exchange lines has a group number, line circuits terminating the private branch exchange lines at the exchange, means responsive to the dialling of the individual directory number of said one line for applying a signal to the relevant line circuit if available to take it into use, a hunting circuit provided in common to all the groups of private branch exchange lines and having a number of stages equal to the largest number of anticipated lines in a group, a plurality of group equipments provided on the basis of one for one group of private branch exchange lines, means responsive to the dialling of the directory number of one group of private branch exchange lines for applying a signal to the group equipment corresponding to said one group of lines, means responsive to the application of said signal to said group equipment for marking unavailable ones of said line circuits in the stages of said hunting circuit and means for initiating the operation of said hunting circuit to take into use the first available one of said line circuits.

7. An automatic telephone exchange including a plurality of groups of private branch exchange lines, a hunting circuit provided in common to all said groups of private branch exchange lines and having a number of stages equal to the largest number of anticipated lines in a group, means responsive to the dialling of the directory number of one group of private branch exchange lines for marking the unavailable condition of lines of said one group in the stages of said hunting circuit, means for initiating the stage-by-stage operation of said hunting circuit to take into use the first one of the available lines of said one group and means effective if trunk-offering facilities are required for removing the unavailable condition of the last line of the group when all the lines of said one group are unavailable to enable trunk-offering to be effected over said last line.

No references cited.